United States Patent [19]

Maunu

[11] 4,023,303
[45] May 17, 1977

[54] FISH MOUTH SPREADER AND HOLDER

[76] Inventor: Olavi Maunu, 5023 Pinewood Ave., West Palm Beach, Fla. 33407

[22] Filed: Feb. 25, 1976

[21] Appl. No.: 661,296

[52] U.S. Cl. .................................. 43/53.5; 43/55; 17/70

[51] Int. Cl.² ........................................ A01K 97/00

[58] Field of Search ............ 17/70, 66, 69; 43/53.5, 43/44.82, 44.6, 54.5, 55, 44.2, 44.8, 36, 4; 128/12, 17, 20; 24/261 C, 248 B, 243 F, 261 B, 67 R; 269/254 R, 254 CS; 294/99 R, 33

[56] References Cited

UNITED STATES PATENTS

| 134,756 | 1/1873 | Marston | 269/254 R |
|---|---|---|---|
| 456,776 | 7/1891 | Prior | 43/36 |
| 1,025,362 | 5/1912 | Beuoy | 43/53.5 |
| 1,879,161 | 9/1932 | Frambach et al. | 43/53.5 |
| 2,226,778 | 12/1940 | Petroff | 294/99 R |
| 2,750,705 | 6/1956 | Keveney | 43/53.5 |
| 3,046,691 | 7/1962 | Courtright | 43/44.6 |
| 3,274,658 | 9/1966 | Pile | 294/99 R |
| 3,757,386 | 9/1973 | Murray | 17/70 |

Primary Examiner—Warner H. Camp
Attorney, Agent, or Firm—D. Paul Weaver

[57] ABSTRACT

Fish mouth spreader jaws are biased to mouth spreading positions by integral spring coils. A readily releasable latch element on the device secures the jaws in retracted positions. The spring coils are beveled to provide thereon a knife-like edge and the tail of a fish is inserted between the spring coils with the knife-like edges gripping opposite sides of the tail and resisting withdrawal of the tail from between the coils when the jaws are latched in retracted positions during a scaling operation or the like.

4 Claims, 8 Drawing Figures

FISH MOUTH SPREADER AND HOLDER

BACKGROUND OF THE INVENTION

Devices are known in the prior art for holding fish and for spreading the mouth of a fish while dislodging a fish hook. Some examples of the patented prior art are contained in U.S. Pat. Nos. 1,208,671; 1,879,161 and 3,757,386.

The objective of this invention is to improve on the known prior art by providing a combination implement for spreading the mouth of a fish and holding a fish tail during a scaling or dressing operation. A further object is to provide such an implement which is unitary and which possesses a direct coaction between the mouth spreading jaw means and the fish tail holding means of the implement.

Additionally, the aim of the invention is to provide a device or implement of the above-mentioned character which can be manufactured very economically and basically can be formed from a single section of rectangular or circular cross section spring wire, with a simple spring latch element attached thereto to retain the jaws of the device retracted and for exerting pressure through the spring coils on the tail portion of a fish being held for scaling.

Other features and advantages of the invention will become apparent during the course of the following detailed description.

BRIEF DESCRIPTION OF DRAWING FIGURES

DETAILED DESCRIPTION

Figure 1:
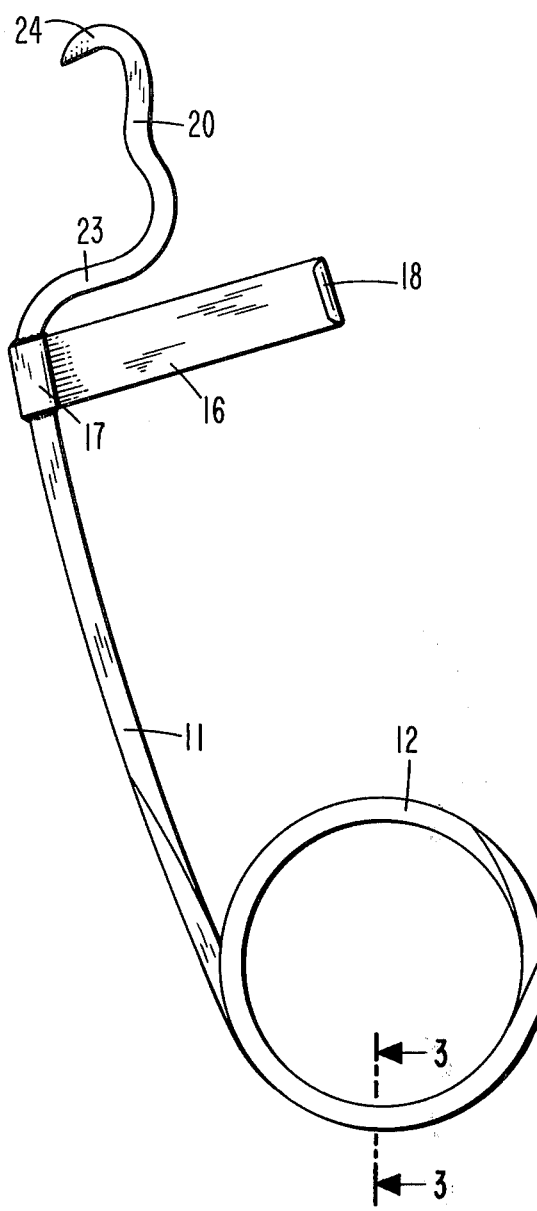
FIG. 1 is a side elevation of a fish mouth spreader and fish holder implement embodying the invention.

Referring to the drawings in detail wherein like numerals designate like parts, a combined fish mouth spreader and fish tail holder is designated in its entirety by the numeral 10, and is formed essentially from a unitary section of spring wire which may be rectangular in cross section, as illustrated, or round cross section wire, if preferred. The combined device 10 comprises a pair of opposing spring arms 11 which are biased toward separated divergent positions, FIGS. 1 and 7, by integral spring coils 12 joined with corresponding ends of the arms 11.

Figure 2:
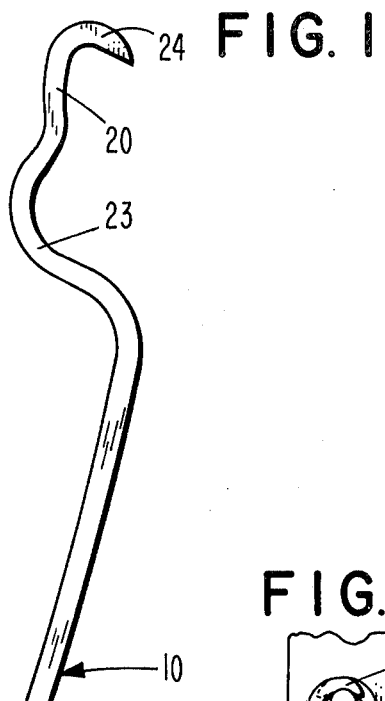
FIG. 2 is a side elevation of the implement on a reduced scale showing the use thereof as a fish tail holder.
Figure 2:
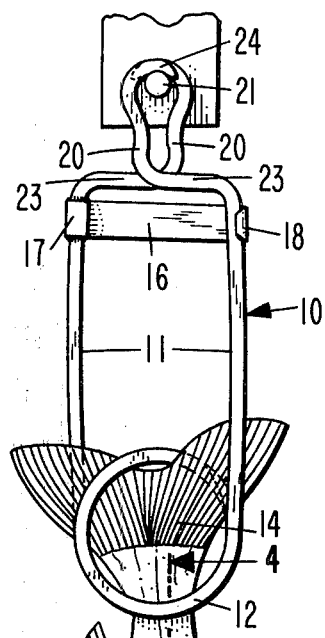

A feature of the invention is that the opposing sides of the coils 12 are beveled to provide knife-like edges 13 for gripping engagement with the tail 14 of a fish, the tail 14 being introduced laterally between the coils 12 while the arms 11 are separated, as in FIG. 1. At this time, the coils 12 are in a relaxed state and are therefore axially spaced or open as indicated at 15 in FIG. 3, so that the fish tail 14 may readily be introduced edgewise therebetween. Following such introduction, the arms 11 are drawn together manually into approximate parallelism, FIG. 2, and are releasably latched in such positions by a spring latch element 16 secured near the free end of one arm 11, as at 17, and having an integral hook-like keeper 18 at its other end to engage around the second arm 11, as shown. When the arms 11 are so held, the spring coils 12 move closer together axially due to being under tension and the space 15', FIG. 4, between the coils is materially reduced causing the knife edges 13 of the coils to bite into opposite sides of the fish tail and tightly grip the tail, particularly resisting forward or longitudinal separation of the tail from the coils 12 when tension is applied to the body 19 of the fish, as when scaling the fish. Such forward pull or tension on the fish causes the edges 13 to bite more deeply into the fish tail and to retain the tail against withdrawal from between the coils 12 approximately as shown in FIG. 2.

During a scaling operation, the closed jaws 20 of the device may be engaged with a nail 21 or some other fixed element to counteract the tension transmitted through the fish to the holding device, or to reduce the pull on the fish during a scaling operation.

Figure 3:
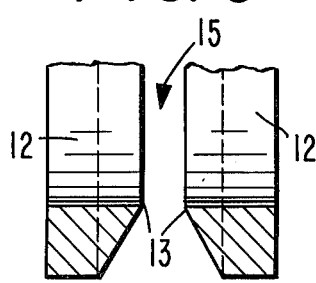
FIG. 3 is an enlarged transverse vertical section taken on line 3—3 of FIG. 1.
Figure 4:
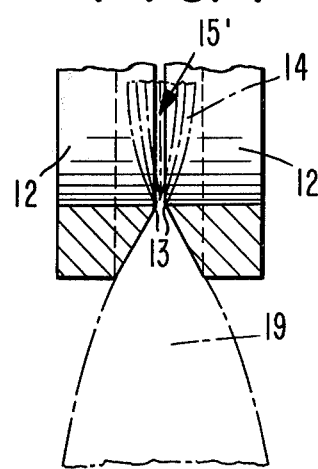
FIG. 4 is a similar fragmentary section taken on line 4—4 of FIG. 2.

Following the scaling of the fish, the spring catch 16 is released and the arms 11 are allowed to separate and this relaxes the tension of coils 12, allowing them to spread axially at 15, FIG. 3, whereupon the fish tail 14 may readily be removed from the holder.

Figure 5:
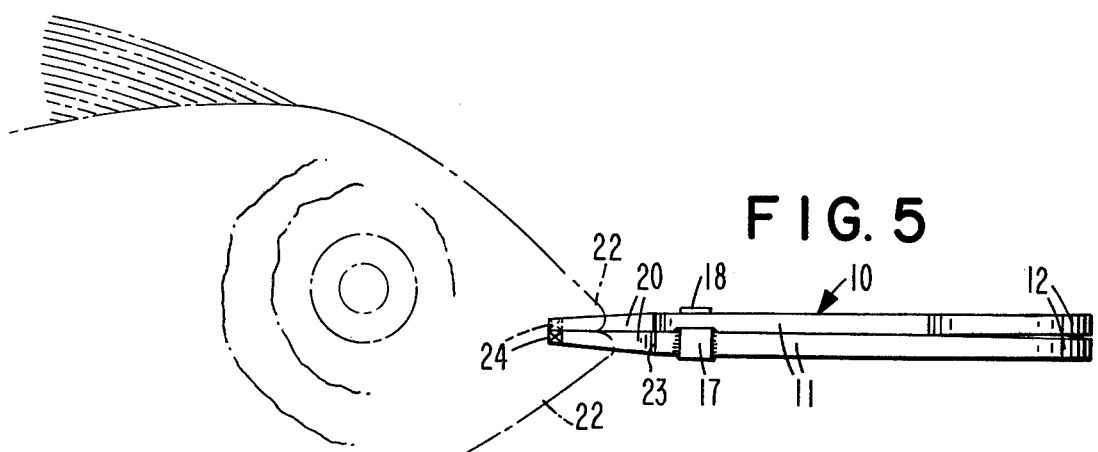
FIG. 5 is an edge elevational view of the implement depicting the initial insertion of spreading jaws into the mouth of a fish.
Figure 5A:
FIG. 5a is an end elevational view of fish mouth spreading jaws showing the beveled construction thereof.
Figure 6:
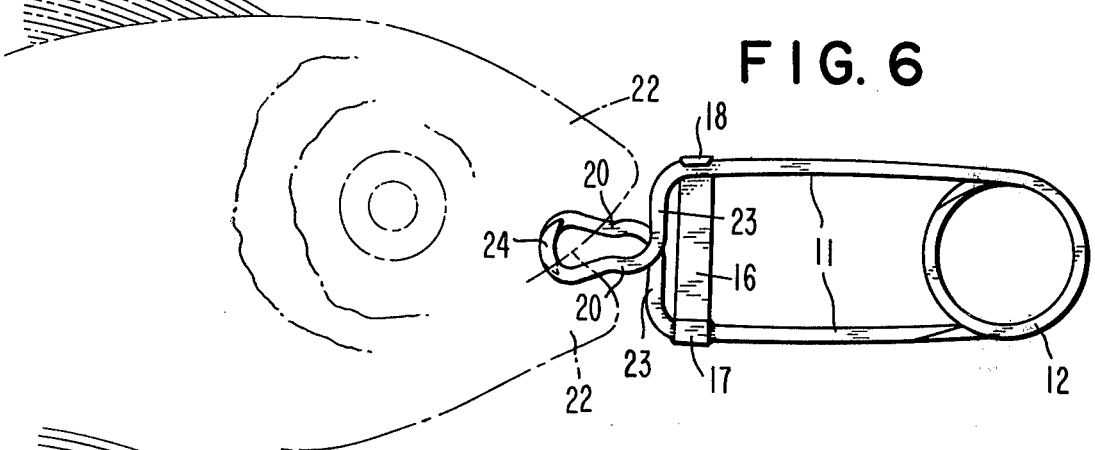
FIG. 6 is a side elevation of the implement after turning ninety degrees in the mouth of the fish and before the release of the jaws.
Figure 7:
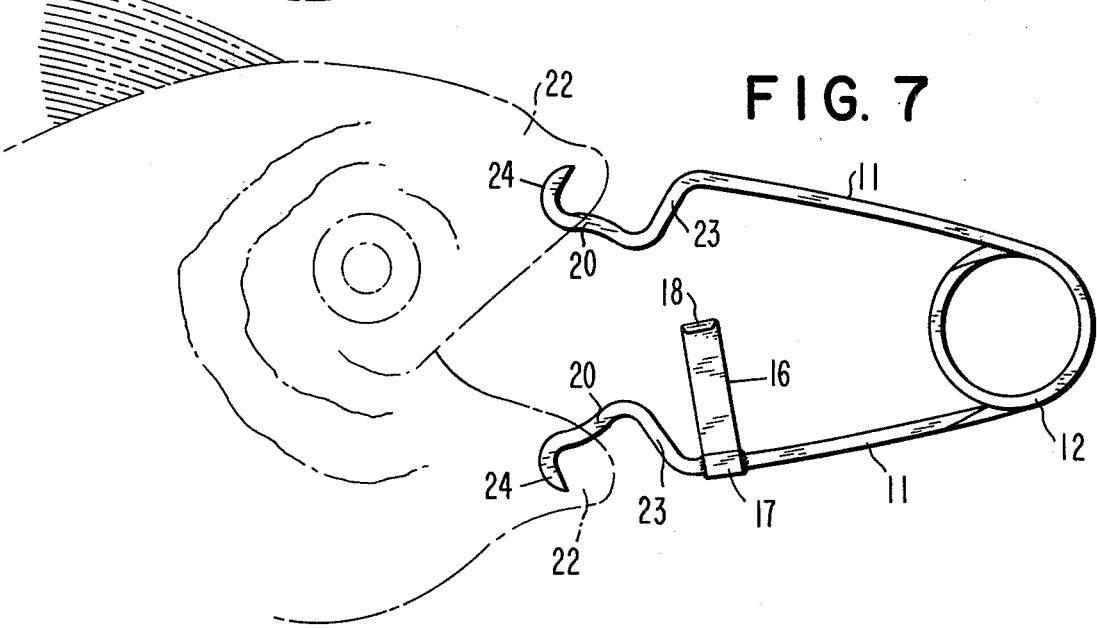
FIG. 7 is a side elevation of the implement after release of the spring jaws and movement thereof to mouth spreading positions.

A second major use of the implement is for spreading the mouth or jaws 22 of a fish to aid in dislodging a fish hook, as depicted in FIGS. 5 through 7. The jaws 20 are offset inwardly from the relatively straight arms 11 by elbow portions 23 and the jaws 20 have oppositely outwardly facing hook terminals 24 which are sharply pointed and beveled on their interior sides as at 25, FIG. 5a, as well as on their outer sides so that the terminals taper and may overlap as depicted in FIG. 5a. This renders the construction of the overlapping jaws slender in one plane for easy insertion edgewise into the closed mouth of the fish as depicted in FIG. 5. The implement is in the latched or closed position, being held by the spring catch 16, at the time of insertion into the mouth of the fish. The jaws 20 are then in the relative opposing positions shown in FIGS. 2 and 6 with their beveled hook terminals overlapping and closed.

With the implement still in the latched condition, FIG. 6, it is rotated ninety degrees on its longitudinal axis which partially pries open the fish jaws 22. Next, the spring catch 16 is released and the stored tension in the coils 12 will force open the arms 11 and jaws 20 until the hook terminals 24 are widely separated under spring tension to force the mouth of the fish widely open. The oppositely facing terminals 24, which are sharp and pointed, will hold the fish's jaws securely and will not slip. However, upon retraction of the jaws 20, the terminals 24 will separate readily from the mouth of the fish and the implement can be withdrawn and again latched in the closed position by the spring latch 16, or catch.

The device is essentially unitary and can be manipulated with one hand. It is rugged and durable in construction, easy to clean, and can be manufactured quite economically. It is a combination device which performs two separate functions in relation to the fish, namely, spreading the mouth of the fish and gripping or holding the tail during scaling or the like. There is a direct operational and structural coaction between the tail holding or gripping means and the mouth-engaging jaw means, in that the coils 12 which power the jaws 20 are also employed in a unique way to grip the tail 14 when the jaws are latched, FIGS. 2 and 4, and to release the tail when the jaws are open, FIGS. 1 and 3. The advantages of the device or implement over comparable prior art devices should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A combination fish mouth spreader and fish tail holder comprising a unitary spring wire body including a pair of spaced opposed arms, at least a pair of spring coil sections integrally joined with said arms so that one arm extends from one spring coil and the other arm extends from the other spring coil, the spring coils and arms lying in spaced generally parallel planes, said spring coils being tensioned to bias said arms into separated divergent relationship, fish mouth spreader jaws carried by the ends of said arms away from said spring coils, and releasably engageable latch means on said arms for securing the arms in retracted non-spreading positions of general parallelism with said spring coils contracted by torsional action whereby their interior sides are drawn together axially into fish tail gripping relationship, the coils separating axially when said latch means is released and said arms are allowed to return to their divergent relationship and the coils are relaxed.

2. A combination fish mouth spreader and fish tail holder as defined in claim 1, and at least the interior opposed sides of said spring coils being beveled to form opposing sharp edges for engagement with a fish tail inserted between said coils.

3. A combination fish mouth spreader and fish tail holder as defined in claim 1, and said fish mouth spreader jaws having oppositely outwardly facing pointed terminals which are tapered toward their tips for side-by-side overlapping with a total terminal thickness approximately equal to a single thickness of the wire forming said wire body.

4. A combination fish mouth spreader and fish tail holder as defined in claim 1, and said latch means comprising a spring catch element on one arm having an end terminal hook adapted to embrace the opposing arm to hold said arms retracted in general parallelism.

* * * * *